July 5, 1955
A. G. BOLDRIDGE
2,712,220
APPARATUS FOR GENERATING POWER BY COMBINING THE
COMBUSTION OF A FUEL-AIR MIXTURE WITH STEAM
Filed May 19, 1951
2 Sheets-Sheet 1
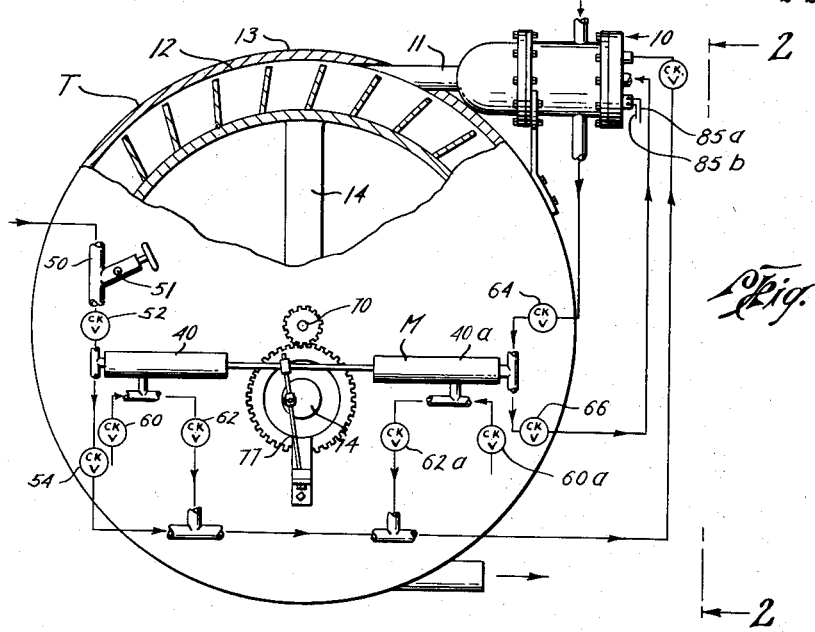
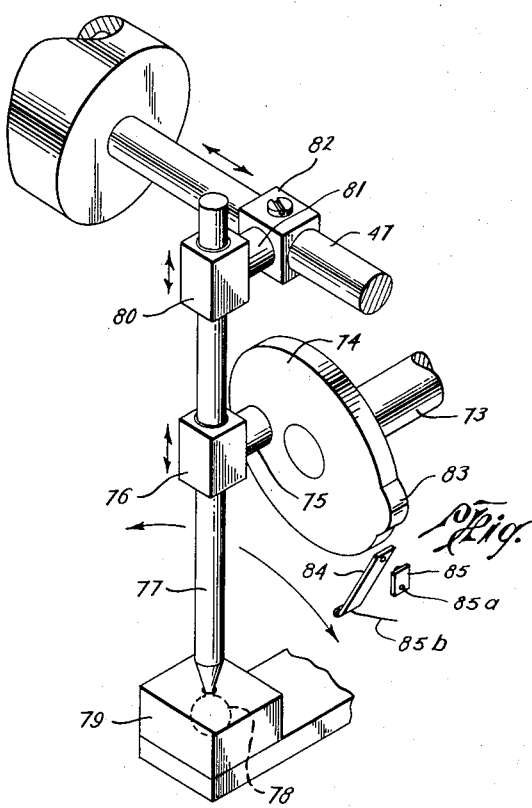
Austin G. Boldridge
INVENTOR.
BY Vincent Martin
and
Joe E. Edwards
ATTORNEYS

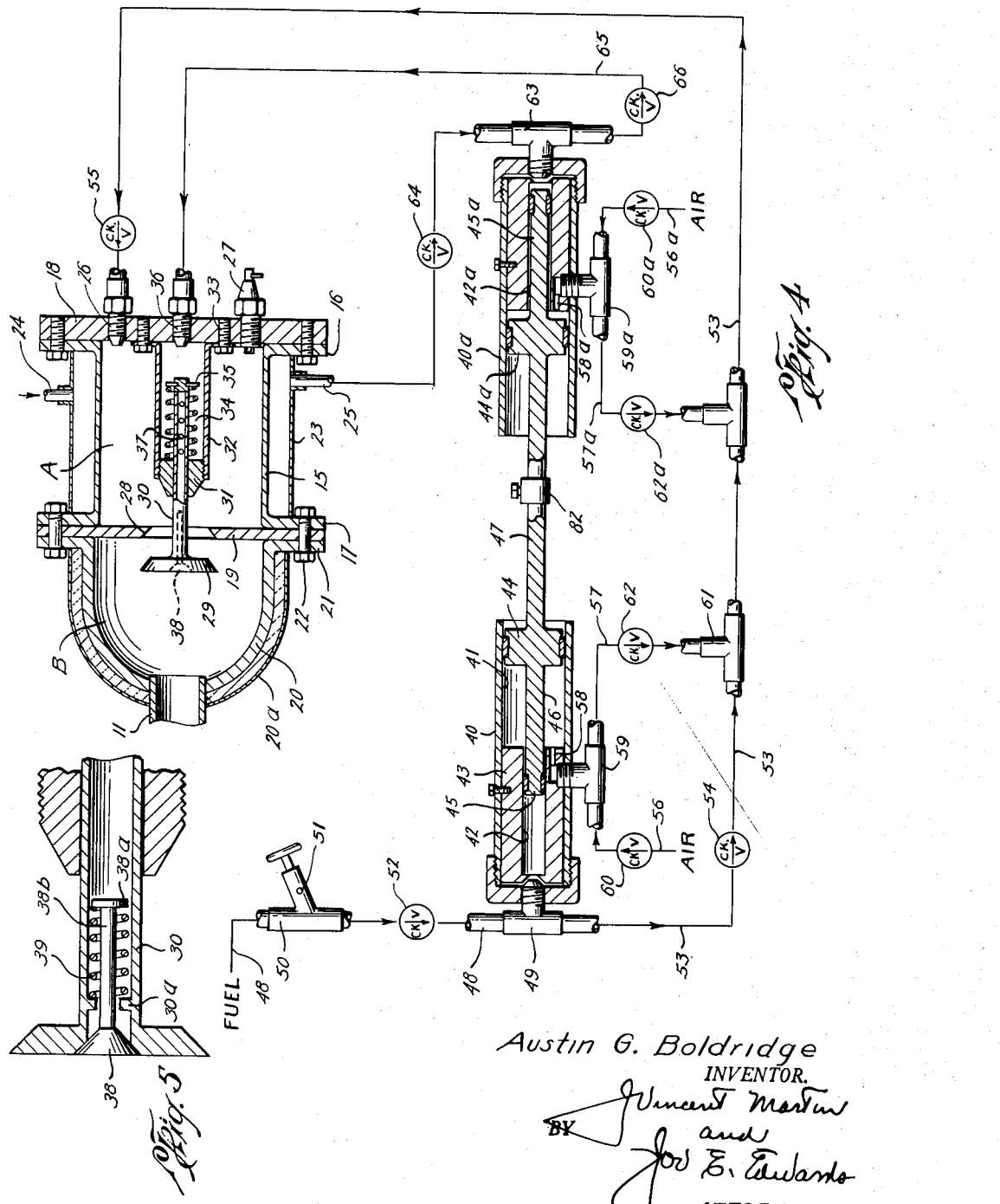

United States Patent Office 2,712,220
Patented July 5, 1955

2,712,220

APPARATUS FOR GENERATING POWER BY COMBINING THE COMBUSTION OF A FUEL-AIR MIXTURE WITH STEAM

Austin Gallatin Boldridge, Shreveport, La.

Application May 19, 1951, Serial No. 227,170

5 Claims. (Cl. 60—39.59)

This invention relates to new and useful improvements in apparatus for generating power by combining the combustion of a fuel-air mixture with steam.

One object of the invention is to provide an improved apparatus for generating power which may be utilized to operate turbines, engines, or other prime movers.

An important object is to provide an improved power generating apparatus which will develop maximum power out-put and which is so constructed that the apparatus may be operated by means of the turbine or engine to which power is supplied so that accurate control of operation may be obtained.

A particular object of the invention is to provide a power generating apparatus wherein a combustible mixture is directed to a firing chamber and upon ignition passes into an expansion chamber, together with means for injecting water into the expansion chamber, whereby the water is converted into steam to thereby increase the power out-put which is utilized to drive a suitable prime mover.

Another object is to provide an apparatus of the character described wherein the water which is injected into the expansion chamber is converted into steam which not only increases power out-put but also functions as a cooling medium which prevents overheating and which increases general efficiency of operation.

Still another object is to provide a power generating apparatus which lends itself to many variations and wherein the injected water may be preheated or the injected fuel may be preheated prior to passage to the firing and expansion chambers; said apparatus including an injector pump mechanism which permits an accurate control of fuel-air mixture as well as accurate control of the water injection.

Another object is to provide an improved injection pump mechanism for power generating apparatus wherein a piston arrangement accurately and simultaneously controls the injection of the fuel-air mixture as well as the water which is introduced into the expansion chamber.

The construction designed to carry out the invention will be hereinafter described together with other features thereof.

The invention will be more readily understood from a reading of the following specification and by reference to the accompanying drawings forming a part hereof, wherein an example of the invention is shown, and wherein:

Figure 1 is a view partly in section and partly in elevation illustrating the improved power generating apparatus constructed in accordance with the invention applied to a steam turbine with the various conductor lines for the fuel, air and water being schematically illustrated, Figure 2 is an end elevation of the assembly shown in Figure 1, as viewed from line 2—2 thereof, Figure 3 is a perspective view of one type of transmitting converter means which converts the rotative movement of the turbine shaft into a reciprocating motion for operating the pump injector mechanism, Figure 4 is a sectional view of the firing and expansion chambers and of the pump injector mechanism with the various connecting lines being schematically illustrated, and Figure 5 is an enlarged sectional valve assembly which is disposed between the firing and expansion chambers.

In the drawings, the numeral 10 designates the power generating unit which has connection, as will be hereinafter explained, with a pump injector mechanism M, whereby a fuel-air mixture and water are supplied thereto. An outlet conduit or discharge 11 extends from the unit 10 and is illustrated as connected with the power chamber 12 of a turbine T. The expanding gases discharged from the unit 10 are directed into contact with the blades 13 of the turbine rotor 14 and thereby impart rotation to said rotor. It is pointed out that although the invention will be described as applied to a turbine, the same may be employed for furnishing power to an engine or any other device which is to be actuated and therefore, the invention is not to be limited to its use with such turbine.

Referring to Figure 4, the unit 10 includes an annular housing 15 having outwardly directed flanges 16 and 17 at each end thereof. A closure plate 18 is bolted to the flange 16 while a transverse partition 19 abuts the opposite flange 17. A dome-like casing 20 having a base flange 21 is adapted to be conneceted by bolts 22 with the flange 17 of the housing 15 and the partition 19 is interposed between these connected flanges. The interior of the housing 15 forms a firing chamber A while the interior of the casing 20 forms an expansion chamber B with these chambers being separated by the transverse plate or partition 19. The discharge line or outlet 11 extends axially from the expansion chamber and, as noted, is connected with the turbine T.

The housing 15 is surrounded by a suitable water jacket 23, having a water inlet line 24 and a water outlet line 25 connected thereto. The casing 20 may be enclosed by suitable insulation 20a to conserve the heat within said casing or if desired a water jacket similar to the jacket 23 may surround said casing.

A fuel and air mixture is introduced into the firing chamber A through an inlet nozzle 26, which is mounted within the closure plate 18 of the housing 15. A spark plug 27 or other ignition device is also connected in the plate 18 and, as will be explained, functions to fire the combustible fuel and air mixture introduced through the nozzle 26. The central portion of the plate or partition 19 which separates the chambers A and B is formed with an axial opening 28 which is normally closed by a valve 29. The valve 29 has a tubular stem 30 which extends downwardly through a guide bushing 31 mounted in the end of a tubular sleeve 32. The opposite end of the sleeve 32 is secured by suitable bolts 33 to the end or closure plate 18. A coil spring 34 which surrounds the valve stem 30 and which is confined between the inner end of the bushing 31 and a washer 35 on the end of the stem constantly exerts its pressure to maintain the valve 29 in a seated or closed position. Thus, when fuel is injected through the nozzle 26 into the chamber A with the valve 29 closed, the combustible mixture is confined within said chamber until the spark plug 27 fires to explode the mixture. Upon firing, the increased pressure due to the expanding gases of combustion will unseat the valve 29 and allow said hot combustion gases to pass into the expansion chamber B from which chamber said gases flow through the outlet 11 to the turbine or other device being actuated.

For injecting water into the expansion chamber an inlet nozzle 36 is mounted axially within the closure plate 18 and the water introduced through this nozzle enters the bore of the tubular sleeve 32. From the sleeve this water flows through radial ports 37 provided in the tubular stem and then through the bore of said stem past a check valve 38 which is mounted in the end of said bore. The check valve 38 is constantly urged to a closed position by a spring 39 (Figure 5) which is confined between lugs 30a formed within the bore of the main valve stem 30 and lugs 38a mounted on the end of the stem 38b of the check valve 38. It is therefore obvious that with the main check valve 29 in a closed position shutting off the firing chamber from the expansion chamber, water may be injected through the smaller check valve 38 into said expansion chamber. When the hot gases of combustion enter the expansion chamber following ignition of the combustible mixture, these hot gases will contact the water within said chamber and will instantaneously convert the water into steam, the power of which is added to the hot gases of combustion and discharged through the discharge line 11 to the turbine. It is therefore obvious that the hot gases of combustion are utilized to convert the previously injected water into steam to increase the power out-put of the unit A. It will be evident that as soon as pressures in the chambers A and B are equalized or the pressure in chamber B exceeds that in chamber A, the valves 29 and 38 will be automatically reseated.

For injecting the fuel-air mixture and the water into the unit A in the manner above described, the pump injector mechanism M is provided. As is clearly shown in Figure 4, the mechanism M includes a cylinder 40 having a bore 41 and a counterbore 42 which is of smaller diameter than the bore 41. As illustrated, the counterbore 42 may be formed by a sleeve insert 43 which is bolted in one end of the bore 41 of the cylinder 40.

An enlarged piston 44 is reciprocable within the bore 41 while a smaller piston or plunger 45 is reciprocable within the counterbore 42; the plunger 45 has connection with the piston through a stem 46 and an operating shaft 47 extends from the piston 44. It will be evident that when the shaft 47 is reciprocated the piston 44 and plunger 45 will be simultaneously reciprocated within their respective bores.

The cylinder 40 with its respective piston and plunger controls the injection of the fuel-air mixture. A fuel line 48 extending from a suitable source of fuel supply has connection through a T 49 with the end of the counterbore 42. A manually adjustable valve 50 having an air inlet 51 is connected with the fuel line and by adjusting this valve a predetermined volume of air may be admitted into the line 48. Beyond the valve 50 is a back check valve 52 connected in the fuel line 48 and it will be evident that when the plunger 45 is moved in a direction to the right in Figure 4, fuel and air will be drawn through the line 48 and into the counterbore 42. Upon a reverse movement of the plunger 45, that is, a movement to the left in Figure 4, the previously admitted fuel-air mixture will be forced outwardly through a fuel line 53 which has connection with the T 49. Upon this stroke of the plunger the check valve 52 will close, causing the fuel-air mixture to be ejected through the line 53 and past a check valve 54 in that line. It might be noted that upon the suction stroke of the plunger 45 the check valve 54 closed which allowed the intake of fuel from line 48. The fuel line 53 extends to the inlet nozzle 26 of the unit 10, and it is preferable that adjacent the inlet nozzle another back check valve 55 be provided.

In order to inject additional air into the line 53, the large piston 44 which is operated simultaneously with plunger 45 functions to inject air from an air supply line 56 through a conduit 57 into the fuel-air line 53. Referring to Figure 4, the inner end of the bore 41 of cylinder 40 communicates through a port 58 with a T 59. The air supply line 56 having a back check valve 60 connected therein is attached to the T 59; the conduit 57 also has connection with the T and through another T 61 is connected with the air fuel line 53. A suitable back check 62 is mounted in the conduit 57.

Upon the suction stroke of piston 44, which is a movement of the piston to the right in Figure 4, air is drawn from the air supply line 56 into the bore 41 of the cylinder. Upon the power stroke of piston 44 this air is directed through conduit 57 into the main fuel-air mixture line 53. It will thus be evident that upon reciprocation of pistons 44 and 45, a fuel-air mixture is injected into the main fuel line 53.

A second cylinder 40a which is identical in construction to the cylinder 40 is provided with a piston 44a and a plunger 45a. The piston 44a has connection to the operating rod or shaft 47 so that the two piston assemblies are simultaneously reciprocated. The piston 44a of the cylinder 40a functions to inject air from an air supply line 56a through a conduit 57a to the main fuel line 53. The construction is exactly the same as has been described with respect to cylinder 40 with a back check 60a being connected in the air supply line, a T 59a having connection through port 58a with the bore of cylinder 40a and with a check valve 62a being mounted within the conduit 57a. It is therefore obvious that the piston 44a functions to inject additional air into the main fuel-air mixture line 53.

The plunger 45a of the cylinder 40a is adapted to inject water and the end of the counterbore 42a of cylinder 40a is connected through a T 63 with the water supply line 25. A suitable back check valve 64 is mounted in the line 25. Upon the suction stroke of the plunger 45a water is drawn through the line 25a into the counterbore 42a. It is noted that this water has passed through the water jacket 23 surrounding the unit A and is therefore preheated. Upon the power stroke of the plunger 45a, the water is directed through a water line 65 which extends to the water injection nozzle 36 of the unit 10. A suitable check valve 66 is mounted in this line.

From the foregoing, it will be evident that when the shaft 47 is reciprocated the two piston assemblies are also reciprocated. As the piston 44 and the plunger 45 move through their power strokes, fuel and air are injected into the main fuel-air mixture line 53. At this time the piston 44a and the plunger 45a are traversing their suction stroke so that piston 44a is withdrawing air from the supply line 56a and the plunger 45a is drawing water from the line 25. Upon a reversal of the movement of shaft 47, the piston 44a and plunger 45a move through their power strokes to inject water through nozzle 36 and to inject additional air into the fuel line 53. During this period, the pistons 44 and 45 are on the suction stroke drawing fuel from the fuel line 48 and air from the air supply line 56. It is therefore evident that water is injected through the nozzle 36 and introduced into the expansion chamber upon the intake stroke of the fuel plunger 45. Upon the power stroke of the plunger 45, fuel is injected into the firing chamber and the timing is preferably arranged so that the spark plug 27 fires prior to completion of the power stroke of the plunger 45. The timing of the firing of plug 27 is preferably controlled by the cam 83 and the switch arm 84, as will be explained. Upon firing, the expansion of the gases due to the explosion of the mixture unseats the main check valve 29 and the hot gases of combustion are directed into contact with the previously injected water to convert this water into steam. Discharge of both the hot gases and the steam is then directed to the turbine. As the pressure in the expansion chamber equalizes with that within the firing chamber the check valves 38 and 39 are closed, and thereafter the water injection cycle again takes place. It is noted that during the injection of water the smaller check valve 38 is opened by the water pressure, while the main check valve 29 remains closed. Of course, as soon as the water injection cycle is completed the check valve 38 closes and thereafter the firing of the explosive mixture within chamber A opens the valve 29 as illustrated in Figure 4.

Any suitable means may be employed for imparting reciprocation to the shaft 47 which will reciprocate the piston and plunger assemblies, but it is preferable that this shaft be actuated by the shaft 70 of the turbine rotor 14. One type of mechanism for imparting reciprocation to the piston and plunger assemblies is illustrated in Figures 1 to 3 wherein the rotor shaft is provided with a drive pinion 71 which is in constant mesh with a drive gear 72. The drive gear is mounted on a stub shaft 73 whereby the connection between gears 71 and 72 imparts rotation to the stub shaft. The outer end of the stub shaft is provided with a cam disc 74 having a pin 75 mounted eccentrically thereof. The pin is rotatably connected with a slide block 76 which surrounds an operating lever 77. The lower end of the lever 77 is mounted by means of a universal joint 78 within a support 79 and as the cam disc 74 rotates, the connection between the pin 75 and block 76 results in a reciprocating swinging movement of the upper end of the lever 77. Connection between the upper end of the lever 77 with the shaft 47 of the piston and plunger assemblies is made through a second slide block 80 which has a rotatable pin connection 81 with a fixed block 82, the latter being secured to the shaft 47.

In operation it will be evident that as the turbine rotor is revolved, its shaft 70 will impart rotation through the gears 71 and 72 to the disc 74. The connection between the disc and the actuating lever 77 through the slide block 76 imparts a swinging reciprocating movement to the upper end of the lever. Through the connection between the upper end of the lever and the shaft 47 a reciprocation is imparted to the piston and plunger assemblies to accomplish the injection of the fuel-air mixture and water in the manner hereinbefore described.

The spark plug 27 is actuated in any suitable manner and may be operated from the cam disc 74. For properly closing the electrical circuit to the spark plug to fire the same, the disc 74 may have one or more cams 83 adapted to coact with a pivoted switch arm 84. When the switch arm is swung it is engaged with a fixed contact 85, said contact and switch arm being connected to the spark plug by wires 85a and 85b. It is evident that any desired timing cycle for firing the spark plug may be employed since said timing cycle is controlled by the provision of the one or more cams 83 on the cam disc.

From the foregoing it will be evident that an apparatus is provided which will increase the power generated by an explosive fuel-air mixture, such increase in power resulting from the conversion of the injected water into steam which is added to the hot explosive gases directed to the turbine or other device being operated. Not only does the injection of the water produce the steam which provides increased power but also the water and steam tend to provide a cooling effect which prevents the device from becoming overheated; it is evident that the combination of the hot expanding gases with the steam will not reach the high degree of temperature which would be attained by the use of the hot gases alone. As illustrated, the water is preheated by passing it through the water jacket surrounding the unit 10, and although this has been found desirable it is not essential since the water could be supplied directly to the counter-bore 45a of the cylinder 40a. Also, it might be desirable to preheat the fuel prior to its injection and in such case the fuel line 48 could be directed through the jacket 23 surrounding the unit, whereby the heat of ignition within the unit 10 will apply some preheating to the fuel prior to its passage into the main fuel injection line 53.

As illustrated in Figure 4, the double valve assembly 29 and 38 is utilized to control the back flow from the expansion chamber. However, it has been found that the inner check valve 38 which is associated with the water injection could be eliminated and in place thereof a spray head provided in the central portion of the valve 29. In this case the expanding gases within the chamber B might tend to pass back through the spray head through the water line 65, but since the construction is such that a back check valve 66 is connected in this line there would only be a very small amount of expanding gases escaping back into the line. For this reason, the apparatus would function substantially as efficiently if the inner check 38 is omitted.

I claim:

1. A power generating apparatus including, a housing having a transverse partition therein dividing the housing into a firing chamber and an expansion chamber, said partition having an opening therein, a check valve in said opening permitting flow from the firing chamber to the expansion chamber while preventing back flow from said expansion chamber, means for supplying a combustible mixture to the firing chamber, means for firing said mixture to develop a pressure sufficient to open said check valve and permit flow of the expanding mixture into said expansion chamber through said opening, a stem on said check valve extending through the firing chamber, said stem and check valve having a hollow passage therein for conducting water through said stem and check valve for discharge from said check valve into said expansion chamber, a water injection chamber within said firing chamber and separated therefrom, said stem extending into said water injection chamber and having an inlet therein communicating with said hollow passage whereby water injected into said water injection chamber is directed to said hollow passage through said inlet, and a back-flow valve having a stem extending into said hollow passage and a valve head adapted to regulate the water flow from the hollow passage into the expansion chamber, spring means to hold said valve head seated to close flow of the water into the expansion chamber until water under a predetermined pressure is injected into the water injection chamber for flow through the hollow passage to open the back-check valve, whereby the opening and closing of said check valve is controlled by the firing of the combustible mixture and the opening and closing of the back-flow valve is controlled by the water injection into the water injection chamber.

2. A power generating apparatus including, a housing having a firing chamber and an expansion chamber, means for injecting a fuel-air mixture into the firing chamber, means for firing said mixture and for directing the hot expanding gases of combustion into the expansion chamber, means for injecting water into the expansion chamber whereby said water is converted into steam by the hot expanding gases, an injector pump assembly for controlling the injection of the combustible mixture and the injection of water into the firing chamber and the expansion chamber, respectively, said injector pump assembly including a cylinder having a bore and a reduced counter-bore, a piston movable within the bore and a plunger movable within the counter-bore, a fuel supply line connected with the counter-bore and a fuel-air line extending from the counter-bore to the firing chamber whereby the reciprocation of the plunger injects fuel into the fuel-air line, an air supply line having connection with the bore of the cylinder and a line connecting said cylinder with the fuel-air line, whereby reciprocation of the piston pumps air into the fuel-air line extending to the firing chamber, a second cylinder, a plunger reciprocable therein and a water line connected with the second cylinder and extending to the expansion chamber whereby reciprocation of the piston within the second cylinder injects water into the expansion chamber.

3. An apparatus as set forth in claim 2, together with means connecting the piston and plunger assembly of the first cylinder with the piston of the second cylinder whereby simultaneous reciprocation within the two cylinders is effected.

4. A power generating apparatus including, a housing having a firing chamber and an expansion chamber, means for injecting a fuel-air mixture into the firing chamber, means for firing said mixture and for directing the hot expanding gases of combustion into the expansion chamber, means for injecting water into the expansion chamber whereby said water is converted into steam by the hot expanding gases, an injector pump assembly for controlling the injection of the combustible mixture and the injection of water into the firing chamber and the expansion chamber, respectively, said injector pump assembly including a dual pump, a fuel supply line connected with one of the pumps, an air supply line separate from said fuel supply line also connected with said first mentioned pump, a fuel discharge line extending from said first-mentioned pump, an air discharge line extending from said first-mentioned pump, a fuel-air line connected to said fuel discharge line and said air discharge line and extending to the firing chamber whereby operation of said first mentioned pump injects a fuel-air mixture into the firing chamber, a water supply line connected with the second pump, and a water injection line extending from the second pump to the expansion chamber whereby operation thereof injects water into said chamber.

5. A power generating apparatus including a housing having a firing chamber and an expansion chamber, means for injecting a fuel-air mixture into the firing chamber, means for firing said mixture and for directing the hot expanding gases of combustion into the expansion chamber, means for injecting water into the expansion chamber whereby said water is converted into steam by the hot expanding gases, an injector pump assembly for controlling the injection of the combustible mixture and the injection of water into the firing chamber and the expansion chamber, respectively, said injector pump assembly including a dual pump, a fuel supply line connected with one of the pumps, an air supply line also connected with said first mentioned pump, a fuel-air line extending from that pump to the firing chamber whereby operation of said first mentioned pump injects a fuel-air mixture into the firing chamber, the second of the pumps including a cylinder having a bore and a counter-bore, a piston movable within the bore and a plunger movable within the counter-bore, a water supply line connected with the counter-bore of the second pump, a water injection line extending from the counter-bore of the second pump to the expansion chamber whereby reciprocation of the plunger injects water into said chamber, an air supply line connected with the bore of the second pump, a conduit connecting said bore of the second pump with the fuel-air line, whereby reciprocation of the piston injects air into the fuel-air line, and means connecting said piston and plunger together for simultaneous reciprocation, whereby operation of the second pump injects water into the expansion chamber and simultaneously injects additional air into the fuel-air line extending to the firing chamber.

References Cited in the file of this patent

UNITED STATES PATENTS

| | | |
|---|---|---|
| 382,643 | Fox | May 8, 1888 |
| 525,271 | Langen | Aug. 28, 1894 |
| 864,821 | Zoelly | Sept. 3, 1907 |
| 965,052 | Wainwright | July 19, 1910 |
| 1,020,535 | Brenner | Mar. 19, 1912 |
| 1,167,555 | Gray | Jan. 11, 1916 |
| 1,227,275 | Kraus | May 22, 1917 |
| 1,728,500 | Martorell | Sept. 17, 1929 |
| 2,114,969 | Rees | Apr. 19, 1938 |

FOREIGN PATENTS

| | | |
|---|---|---|
| 9,632 | Australia | Oct. 12, 1933 |
| 464,480 | France | Jan. 12, 1914 |
| 835,818 | France | Oct. 3, 1938 |